Figure 1:
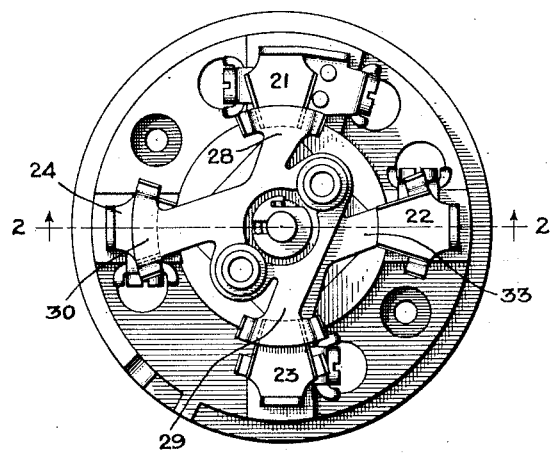

Inventor:
Percy W. Gumaer.

P. W. GUMAER.
HEAT CONTROL SYSTEM.
APPLICATION FILED MAY 10, 1917.
1,359,889.
Patented Nov. 23, 1920.
3 SHEETS—SHEET 2.
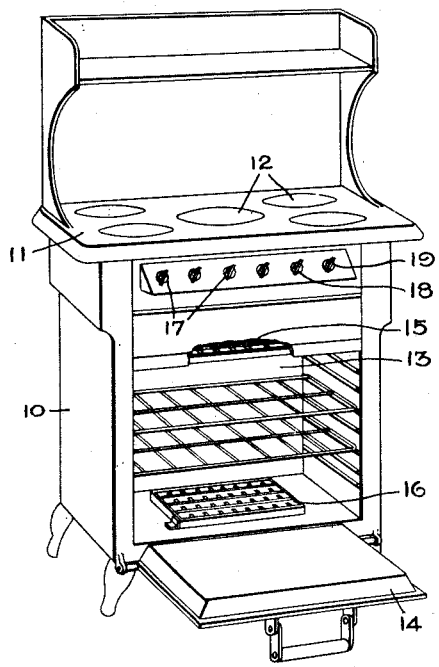
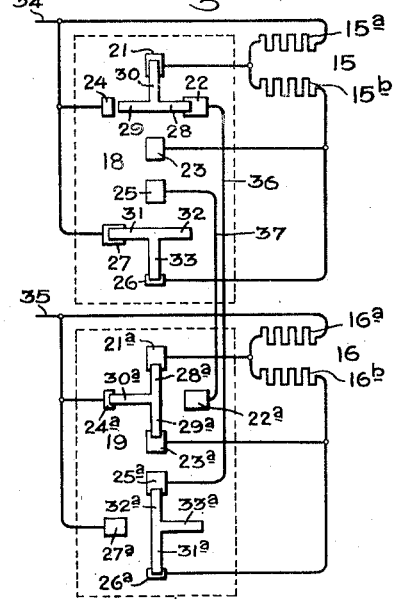
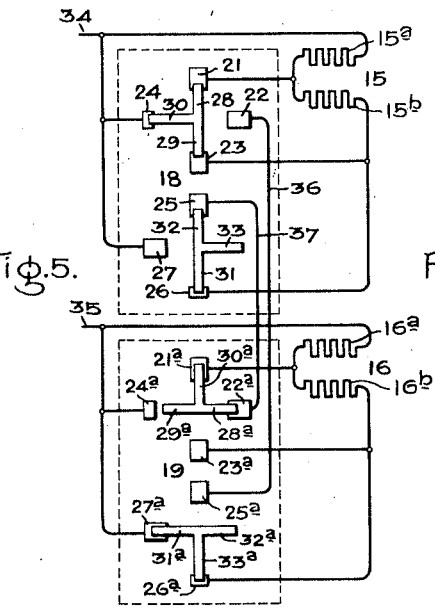
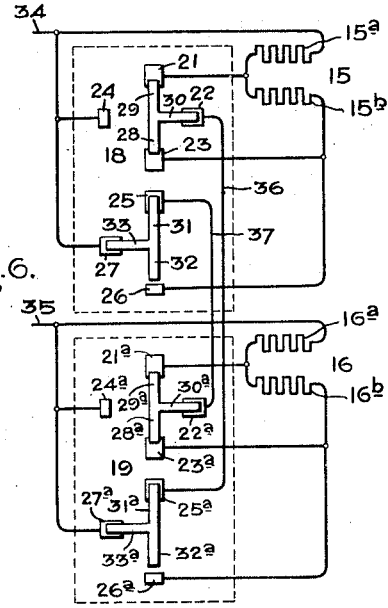
Inventor:
Percy W. Gumaer,
by
His Attorney.

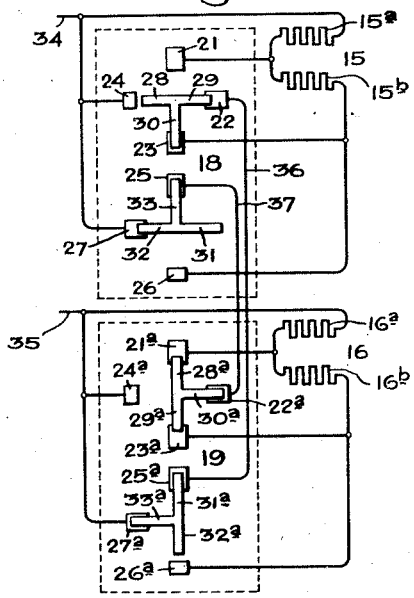
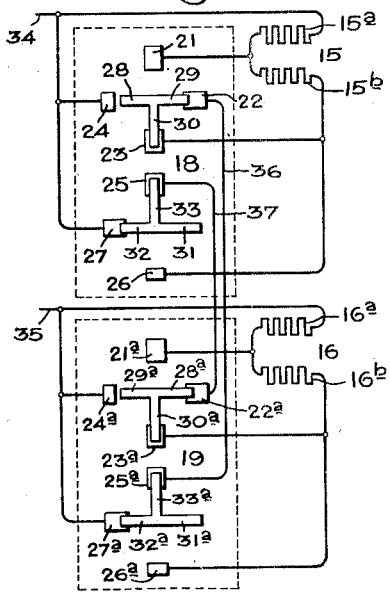
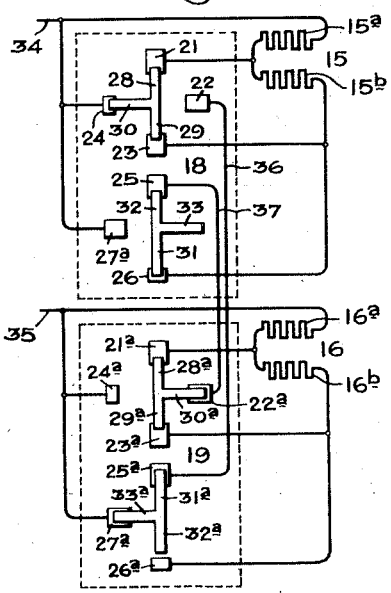
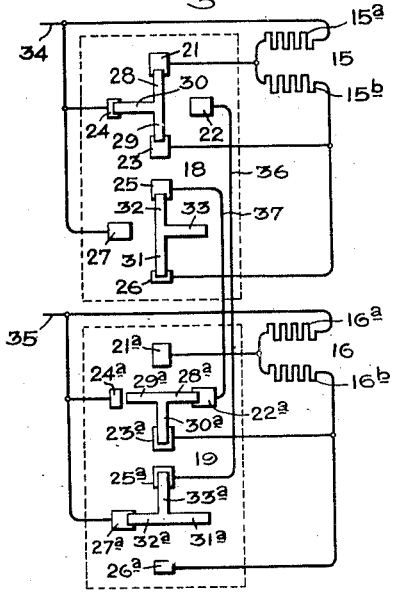

UNITED STATES PATENT OFFICE.

PERCY WILCOX GUMAER, OF PITTSFIELD, MASSACHUSETTS, ASSIGNOR TO GENERAL ELECTRIC COMPANY, A CORPORATION OF NEW YORK.

HEAT-CONTROL SYSTEM.

1,359,889.   Specification of Letters Patent.   Patented Nov. 23, 1920.

Application filed May 10, 1917. Serial No. 167,735.

*To all whom it may concern:*

Be it known that I, PERCY WILCOX GUMAER, a citizen of the United States, residing at Pittsfield, county of Berkshire, State of Massachusetts, have invented certain new and useful Improvements in Heat-Control Systems, of which the following is a specification.

My invention relates to a heat control system and comprises a plurality of heating units and means for varying the energy supplied to one or both of the units and for cutting off the energy supply to one of the units when the other unit is connected for more than a predetermined supply.

My invention is particularly applicable to heating devices comprising a plurality of heating units all of which affect the same article or material, and may be applied to ovens which are commonly provided with heating units at the top and the bottom capable of being operated at different degrees of heat.

In an oven it is desirable to provide different combinations of heat in the different heating units with which the oven is provided, and while it is desirable to simultaneously operate the two units at the lower degrees of heat and sometimes to operate one of the units at its maximum degree of heat, it is undesirable to operate either of the units at its maximum degree of heat and at the same time to operate the other unit at all, as under such conditions the oven will become greatly overheated should the power be left on accidentally for several hours.

In the preferred form of my invention the supply of energy to the different units is under the joint control of two or more switches and while energy may be supplied to any unit in different degrees up to and including its maximum rating and while energy may be supplied in limited amounts simultaneously to the various units, the connections are such that the energy supplied to one unit is cut off when the other unit is connected for more than a predetermined supply, usually its maximum supply.

In a patent which was issued to A. F. Berry on June 6, 1916, #1,186,270, is described an arrangement comprising an interlocking mechanism for accomplishing a result similar to that set forth in this application. In accordance with my present invention, which is an improvement on the Berry device, the same result is accomplished by means of coöperating switches which are electrically interconnected.

In accordance with my invention the total amount of energy that can be supplied to a plurality of electric heating units is therefore limited to an amount less than the aggregate amount of their maximum ratings, and such an arrangement is desirable in conjunction with ranges and similar heating devices in which a comparatively large amount of energy is required when the various heating units with which the heating device is provided are connected for simultaneous operation.

Figure 2:
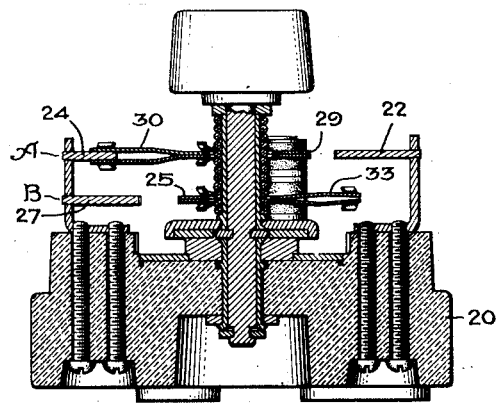

My invention will best be understood by reference to the accompanying drawings, in which I have shown one embodiment of my invention and in which: Figure 1 is a plan view of a switch, with the switch button removed, which may be used in conjunction with my invention; Fig. 2 is a section on the line 2—2 of Fig. 1; Fig. 3 is a perspective view of a range showing one embodiment of my invention; and Figs. 4, 5, 6, 7, 8, 9 and 10 are diagrammatic views illustrating the system of connections and showing the switches in different positions for supplying different combinations of energy to the heating units.

Referring now to the drawings, and first to Fig. 3, 10 is the frame of a range in which I have shown my invention embodied and which is provided with the usual top 11 on which may be mounted hot plates 12 or similar heating devices. The range is provided with an oven 13 which may be closed by a door 14 and which may be provided at the top and bottom with heating units 15 and 16 respectively. The specific construction of the heating units *per se* constitutes no part of my present invention and it is therefore unnecessary to describe the same, though it may here be noted that one or both of these units are arranged to be heated to different degrees in a manner well understood in the art and in a manner illustrated in the diagrammatic views. The various heating devices of the range may be controlled by switches 17 in the usual manner with the exception that two of these switches which I have indicated by the reference numerals 18 and 19, control the energy to the oven units and are arranged in accordance with my present invention.

Referring now to Figs. 1 and 2 which illustrate a form of switch applicable for use in connection with my invention, 20 is an insulating base upon which are mounted upper and lower series of stationary contacts A and B, the upper series comprising contacts 21, 22, 23 and 34, preferably located 90 degrees apart, and similar in form with the exception that contact 24 is shorter than the others and accordingly farther removed from the center of the switch. The lower series comprises contacts 25, 26 and 27 arranged beneath the upper contacts but with one blank space beneath the contact 22. The contact 26 is shorter than the contacts 25 and 27. The rotary part of the switch comprises an upper plate provided with contact arms 28, 29 and 30, and a lower plate provided with contact arms 31, 32 and 33 for engaging the upper and lower series of stationary contacts respectively. The arm carrying the contact 30 of the upper rotary part of the switch is longer than those carrying the contacts 28 and 29 so that the contact 30 is arranged to engage any of the four stationary contacts while either of the two contacts 28 or 29 may engage any of the contacts 21, 22 or 23 but cannot engage the shorter contact 24. The lower rotary part of the switch is provided with two long arms 31 and 33 each of which is arranged to engage any of the three stationary contacts and is also provided with one shorter arm 32 which is arranged to engage the contacts 25 and 27, but does not engage the shorter contact 26.

Each of the heating units 15 and 16 preferably comprises two elements 15$^a$ and 15$^b$, and 16$^a$ and 16$^b$, respectively, which are intended to furnish different degrees of heat by being connected in series for low heat, in multiple for high heat, and with a single one of the elements connected in circuit for medium heat. The element 15$^a$ is connected directly to one of the supply conductors 34 and one terminal of the element 15$^b$ is connected to said conductor through the switch 18. The other terminals of the two elements 15$^a$ and 15$^b$ are connected to the contact 21 which is connected to the other supply conductor 35 through the other switch 19 which is identical in construction and operation with the one above described. Accordingly I have indicated the corresponding parts of the second switch with reference numerals corresponding to those of the first switch but with the subscript "a." In a similar manner one element 16$^a$ of the lower heating unit is connected directly to the other supply conductor 35, the other element 16$^b$ being connected thereto through the switch 19, while both of the elements 16$^a$ and 16$^b$ are connected to the contact 21$^a$. The contacts 24 and 27 of the upper switch are connected together and to the supply conductor 34 while the corresponding contacts 24$^a$ and 27$^a$ of the lower switch are similarly connected together and to the other supply conductor 35. The contacts 23 and 26 of the upper switch are also connected together and to one of the terminals of the heating element 15$^b$. The contacts 23$^a$ and 26$^a$ of the lower switch are similarly connected together and to one terminal of the heating element 16$^b$. The contact 22 of the switch 18 is connected by the conductor 36 to the contact 25$^a$ of the lower switch and the contact 25 of the upper switch is connected by the conductor 37 to the contact 22$^a$ of the lower switch. The circuit for both elements of the upper heating unit 15 are completed through the conductor 36 while the circuit for both elements of the lower heating unit are completed through the conductor 37. The switches are accordingly interconnected electrically but not mechanically and the supply of energy to each unit is under the joint control of both switches.

The connections to each of the switches are such that each of the units 15 and 16 can be supplied with different amounts of energy, but when one of the units is connected for its maximum supply, no energy can be supplied to the other unit. In the position of the switches shown in Fig. 4 a maximum amount of energy is supplied to the unit 15 and no energy is supplied to the unit 16. With the upper switch in the position there shown the element 15$^a$ is connected directly to the line 34 while the element 15$^b$ is connected in parallel to the unit 15$^a$ through the contacts 27 and 26. Both elements as above stated, are connected to the contact 21 and their circuits are completed through the arms 30 and 28, contact 22, conductor 36, contact 25$^a$, arms 32$^a$ and 31$^a$, contacts 26$^a$ and 23$^a$, arms 29$^a$ and 30$^a$, contact 24$^a$ to the other supply conductor 35. With the switches in the position shown in Fig. 4 the lower unit 16 receives no energy, and with the switch 18 in the position shown, no energy can be supplied to the lower unit since its energy supply must come by the way of the contact 25 and the conductor 37, and the contact 25 is disconnected from the movable part of its switch when the latter is in a position to supply the maximum amount of energy to its unit 15 as shown in the figure. With the switches in the positions shown in Fig. 5 the connections for the upper unit are opened between the contacts 21 and 22 so that this unit receives no energy and the two elements 16$^a$ and 16$^b$ of the lower unit are connected in multiple to receive the maximum amount of energy. In Fig. 6 the connections are such that both the upper and the lower units receive a medium amount of energy; that is to say, in the upper unit only the element 15ª is connected in circuit and in the lower unit only the element 16ª is connected in circuit. Figs. 7, 8, 9 and 10 illustrate the switches in such positions that different combinations of energy can be supplied to the two units. It is thought, however, that with the above explanation in view it will be unnecessary to follow the connections of the two units. In Fig. 7 the upper unit is connected for low heat, that is to say both elements are connected in series and the lower element is connected for medium heat. In Fig. 8 both the upper and lower units are connected for low heat. In Fig. 9 the upper unit is connected for no heat and the lower unit for medium heat, and in Fig. 10 the upper unit is connected for no heat and the lower unit for low heat.

It is to be observed that the energy supply for the upper unit passes along conductor 36 and to the contact 22 and that the circuit cannot be completed when the lower switch is in a position to supply the maximum amount of energy to the lower unit; that is to say, when the lower switch is in the position shown in Fig. 5. Similarly, the energy supply for the lower heating unit 16 must pass along the conductor 37 from the contact 22ª to the contact 25 and when the upper switch is in such a position that the upper unit 15 receives its maximum energy supply, no energy can be supplied to the lower unit. This condition is illustrated in Fig. 4.

In accordance with the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. In combination, a plurality of electric heating units each comprising a plurality of heating elements, and means comprising electrically interconnected switches for connecting heating elements of each of said units in series and in multiple and for disabling the connections to one of the units when heating elements of the other unit are connected in multiple.

2. In combination, a heating device provided with a plurality of heating units, each comprising a plurality of heating elements arranged to operate on the same article, and means comprising a plurality of switches and an operating member therefor for simultaneously connecting the units, each with one element directly across the line and connecting heating elements of each of said units in multiple, and for disabling the connections to one of the units when heating elements of the other unit are connected in multiple.

3. In combination, a plurality of heating units, one of which comprises a plurality of heating elements, and means comprising a plurality of switches and an operating member therefor for simultaneously connecting the heating elements of said units to the supply lines in different arrangements and for disabling the connections to another of said units when said plurality of heating elements of one of said units are connected in multiple.

4. In combination, a plurality of heating units each comprising two heating elements, and means comprising electrically interconnected switches for connecting a single heating element of each heating unit directly across the supply lines and connecting the two heating elements of any heating unit in series and in multiple, and for disabling the connections to one of said heating units when the heating elements of the other unit are connected in multiple.

5. In combination, a heating device comprising a plurality of heating units each provided with a plurality of heating elements, a plurality of switches having an operating member for simultaneously connecting said units across the line with their respective elements in different series and multiple combinations but disabling the connections between said units when their elements are all connected in multiple.

In witness whereof, I have hereunto set my hand this 2nd day of May, 1917.

PERCY WILCOX GUMAER.